US 8,010,642 B2

(12) United States Patent
González Lopéz et al.

(10) Patent No.: US 8,010,642 B2
(45) Date of Patent: Aug. 30, 2011

(54) APPARATUS FOR MEDIATING IN MANAGEMENT ORDERS

(75) Inventors: Maria Pilar González Lopéz, Madrid (ES); Fabian Castro Castro, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 708 days.

(21) Appl. No.: 10/596,003

(22) PCT Filed: Nov. 28, 2003

(86) PCT No.: PCT/SE03/01818
§ 371 (c)(1),
(2), (4) Date: Feb. 8, 2007

(87) PCT Pub. No.: WO2005/053229
PCT Pub. Date: Jun. 9, 2005

(65) Prior Publication Data
US 2007/0204015 A1    Aug. 30, 2007

(51) Int. Cl.
*G06F 15/173* (2006.01)
(52) U.S. Cl. .................................... 709/223; 709/224
(58) Field of Classification Search .................. 709/223, 709/224
See application file for complete search history.

(56) References Cited

U.S. PATENT DOCUMENTS

| 5,987,513 | A | * | 11/1999 | Prithviraj et al. ............. 709/223 |
| 6,052,382 | A | | 4/2000 | Grohmann et al. |
| 6,363,421 | B2 | * | 3/2002 | Barker et al. ................. 709/223 |
| 6,487,590 | B1 | * | 11/2002 | Foley et al. .................... 709/223 |
| 6,782,420 | B1 | * | 8/2004 | Barrett et al. ................. 709/223 |
| 6,934,749 | B1 | * | 8/2005 | Black et al. ................... 709/224 |
| 7,039,724 | B1 | * | 5/2006 | Lavian et al. ................. 709/250 |
| 7,111,053 | B1 | * | 9/2006 | Black et al. ................... 709/220 |
| 7,315,826 | B1 | * | 1/2008 | Guheen et al. .................... 705/7 |
| 2002/0029298 | A1 | | 3/2002 | Wilson |
| 2002/0069274 | A1 | * | 6/2002 | Tindal et al. ................. 709/223 |
| 2002/0116485 | A1 | * | 8/2002 | Black et al. ................... 709/223 |

FOREIGN PATENT DOCUMENTS

| EP | 1298897 A1 * | 4/2003 |
| GB | 2 397 194 A | 7/2004 |
| WO | WO 98/37707 A | 8/1998 |
| WO | WO0219116 A1 * | 3/2002 |
| WO | WO02059763 A1 * | 8/2002 |

* cited by examiner

*Primary Examiner* — Wing Chan
*Assistant Examiner* — Kostas Katsikis

(57) ABSTRACT

A method and an apparatus are described herein for mediating management orders between a plurality of origin managers and a plurality of managed devices in a telecommunications system. The apparatus comprises: a Communication Receiver Component arranged for receiving management orders, a Communication Sender Component arranged to send an allowed management order to a managed device, and a Management Verifier Component, arranged to determine whether a received management order is an allowed management order.

36 Claims, 3 Drawing Sheets

APPARATUS FOR MEDIATING IN MANAGEMENT ORDERS

FIELD OF THE INVENTION

The present invention relates to the management of devices in a telecommunications system—and, more specifically, to the mediation in management orders issued towards said managed devices.

BACKGROUND

A telecommunications system can be considered as a system comprising a plurality of devices arranged to cooperate among them to provide telecommunications services to a plurality of users. Their number and kind depend on the particular characteristics of a telecommunications system and, in general, depend to a great extent on the functions implemented and services provided by (or through) said system. Devices on a telecommunication system are, for example: Public Switches of public switched telephone networks PSTN, Mobile Switching Centers MSCs, Serving or Gateway GPRS Support Nodes SGSNs GGSNs, Session Initiation Protocol SIP proxy or redirect servers, data bases storing data related to users or services (such as Home Location Registers HLRs, Number Portability data bases, user profile data bases, etc), specialized servers for pre-paid or post-paid processing, application servers, protocol and/or media gateways, authentication-authorization-accounting servers AAA, data packet routers, etc. User terminals utilized by the end users of a telecommunications system to access to the services it provides (e.g.: mobile phones, personal computers, etc), can also be considered as devices in a telecommunications system.

Each device in a telecommunications system can perform or intervene in the accomplishment of one or more services and/or functions, and can hold one or more data objects that can be used, for example, as parameters for governing an execution aspect of said function or service, or as information elements for shaping or characterizing the content of the information provided by said function or service. The nature of a particular data object can vary according to the nature of the specific service or function it relates to. For example, a data object can be a single data structure comprising just an integer value that determines e.g. a given time value of a protocol timer, or can be a complex data structure that stores e.g. data related to a subscriber (e.g.: a set of identifiers such as his Mobile Subscriber ISDN Numbers MSISDN, International Mobile Subscriber Identity IMSI number, Uniform Resource Locators URLs, allowed services, subscribed/activated services, etc) or to a service (e.g.: service name, available languages, allowed users, available service time per user, service specific data, etc).

A given device in a telecommunications network can contain one or more data objects which are manageable by means of one or more management operations which allow a data object to be initially set, accessed, modified, erased, etc. This is commonly achieved by entering into the managed device a management order which requests one or more management operations over one or more managed data objects said device holds.

Among other factors, the huge number of devices in some state-of-the-art telecommunications systems, as well as their distribution in distant geographical locations, has made unfeasible to handle the management processes locally (e.g. by entering management orders into said devices by means of a local management terminal connected to a local management interface in the managed device). This has driven to the development of management frameworks which allow to handle the management process remotely. These management frameworks usually comprises a number of management servers, arranged to issue remotely management orders to, commonly, a plurality of managed devices, and the use of one or more management protocols—(such as the standardized "Simple Network Management Protocol" SNMP, "Lightweight Directory Access Protocol" LDAP or other non-standardized—i.e. ad oc, proprietary—management protocols) to convey the management orders between a management server and a managed device (as well as, when it proceeds, to convey the corresponding responses from a management device to a management server); wherein the management servers and the managed devices communicates via one or more communication networks to which they are connected. Additionally, for handling more homogeneously the management processes, it is usually defined the identifiers and generic pattern structures of the commonly managed data objects (which can comprise, for example, the data structure of the data attributes in said data objects together with their relationships, as well as their respective value range), and also the identifiers of the management operations to initially set, modify, obtain, etc, these data objects.

Accordingly, a management order can comprise an identifier of a managed device (e.g.: an Internet Protocol IP address, a URL, etc), an identifier of a managed data object, and an identifier of a management operation. In some cases wherein, for example, a response to a management order needs to be sent from a managed device (e.g.: conveying a result, or conveying the content of a data object), a management order can also comprise an identifier (e.g.: an Internet Protocol IP address, a URL, etc) of the management server which sends it in order to send back said response.

Given that the content of management orders sent to the managed devices, as well as the content of the eventual subsequent responses from the managed devices, can be considered as sensitive information, secure communication mechanisms can be also utilized to establish a secure communication between a management server and a managed device which can prevent eavesdropping.

On the other hand, and conditioned (among other) by the need of using multiple-purpose platforms and products and facilitating the management processes, there can be cases where the same machine (e.g.: a personal computer) can be utilized as a management server by a given person to issue management orders, as well by other people for the same or different purposes. Similarly, a subscriber of a telecommunication system can use his end user terminal (e.g.: a mobile phone) as a management server to issue managements orders (e.g.: through a self-provisioning application accessed via HTTP or WAP) which request the execution of management operations over his subscription data or service data. Accordingly, the origin of a management order (hereinafter referred as "origin manager") can be considered as comprising, not only the machine from which it is sent, but, additionally or alternatively, the user who is operating said machine.

In summary, the constant evolution of products, platforms and services has made the telecommunications systems become more complex, with more number and kind of devices to be managed. At the same time, the management orders can be originated from a greater number of origin managers due, not only to scalability, reliability or usability reasons, but also due to the specialization and/or assignation of some origin managers for managing certain kind of devices and/or certain kind of data objects (e.g.: management orders related to user-subscription data in HLRs, related to provisioning of service data in service data bases or application servers, related to operation and maintenance functions in certain devices, etc).

However, the greater is the number of origin managers, the greater is the possibility of having failures in the management processes; and neither, the mere use of pre-defined (or standardized) structures and coding for management operations and managed data objects, nor the use of secure communication mechanisms, can prevent per se that, for example, a local malfunction in a management server, or an error of the user operating said management server, or a misuse of said user, etc; causes the execution of an inappropriate management operation that makes an improper access or modification of data on a given device.

It is therefore an object of the present invention to ensure that only the appropriate management operations are executed and, at the same time, to alleviate the managed devices of receiving, checking or executing improper management orders.

SUMMARY OF THE INVENTION

The aforementioned object is achieved by an apparatus as described and claimed herein. This object is also achieved by a method or by a computer program as described and claimed herein.

In one aspect, the invention relates to an apparatus for mediating in management orders between a plurality of origin managers and a plurality of managed devices in a telecommunications system. The apparatus comprises: a Communication Receiver Component arranged for receiving management orders, a Communication Sender Component arranged to send an allowed management order to a managed device, and a Management Verifier Component (MVC), arranged to determine whether a received management order is an allowed management order. The Management Verifier Component checks whether a received management order fits with the access attributes comprised in one, or more, management access templates; wherein said templates are selected according to its relationship with an identifier of the origin manager sending the order, and/or with an identifier of a managed data object affected by said order, and/or with an identifier of a managed device affected by said management order.

In a further aspect, the invention relates to a method for mediating in the management of a plurality of devices of a telecommunication system from a plurality of origin managers. A method according to the invention comprises the steps of: (a) receiving a management order in a centralized management mediator; (b) checking in said mediator whether said management order fits with the access attributes comprised in one, or more, management access templates selected according to its relationship with an identifier of the origin manager sending the order, and/or with an identifier of a managed data object affected by said order, and/or with an identifier of a managed device affected by said management order, to determine whether a received management order is an allowed management order; and (c) granting said management order to be sent to a managed device if it is an allowed management order.

In a further aspect, the invention relates to a computer program for mediating from a computer-based apparatus in management orders between a plurality of origin managers and a plurality of managed devices in a telecommunications system. The computer program comprises: a computer-readable program code for causing said computer-based apparatus to process the reception of a management order from an origin manager; a computer-readable program code for causing said computer-based apparatus to determine whether a received management order is an allowed management order by checking whether said management order fits with the access attributes comprised in one, or more, management access templates selected according to its relationship with an identifier of the origin manager sending the order, and/or with an identifier of a managed data object affected by said order, and/or with an identifier of a managed device affected by said management order; and a computer-readable program code for causing said computer-based apparatus to send an allowed management order to a managed device.

An apparatus, method or computer program according to the invention allows a centralized management access point where to determine whether a management order is valid and admissible taking into account the interrelationships between all the entities and elements said order relates to, wherein some of which could be not explicitly identified in a management order. Further, the invention alleviates the managed devices about tasks which are beyond its specific functional scope and basic management support, such as the identification of allowed origin managers, and thus, makes redundant the sending of a huge number of management orders to a vast number of devices that, otherwise, would have to be sent to parameterize said tasks.

The content of the management access templates, whose access attributes identify elements and/or entities in relationship with an identifier of an element or entity that can be involved in a management operation, can vary according to various alternative or complementary embodiments, by means of which it can be achieved a higher or lower degree of granularity for defining the elements and entities that can be involved in an allowed management order.

According to an embodiment of the invention, one or more management access templates can primarily be selected according to one or more identifiers obtained from a received management order, and, subsequently, one or more management access templates can also be selected in relationship with access attributes contained in one of said primarily selected templates. Therefore, the invention can make possible, for example, to hide a real identifier of a managed device, such as a real IP address or an alias directly usable for routing a management order to a managed device, by selecting, for routing an allowed management order, an identifier of the corresponding managed device contained in a management access template selected in relationship with said management order which might be unknown for the management server sending said management order, and thus, might not be present, as such, in said management order.

According to an embodiment of the invention, a received management order is determined to be an allowed management order only if the origin manager is successfully authenticated; wherein the authentication of said origin manager comprises the authentication of an identifier of the management server sending said management order, or an identifier of a user operating said management server, or both. Accordingly, only verified management servers, or verified users, or verified users operating verified management servers, are granted to send an allowed management order to a managed device.

According to an embodiment of the invention, a management role is determined from an identifier of the origin manager, which can comprise an identifier of the management server sending said management order, or an identifier of a user operating said management server, or both. According to a further embodiment, one or more management access templates can be selected which are related to said role. According to a further embodiment, one or more management access templates comprise, as an access attribute, the identifier of the allowed roles for the elements and/or entities said template relates to. Thus, some global management access rules can be defined considering the kind of origin manager with regard to its kind of duties additionally or alternatively to those that can relate to a specific origin manager.

According to an embodiment of the invention, an access attribute in a management access template can be a managed data object; wherein, according to the invention, it is verified whether said access attribute is affected as a managed data object by an allowed management order, and if so, the corresponding management operations are performed on it. Therefore, the rules governing what elements and entities can be involved in an allowed management order, can easily be modified in a central point.

According to an embodiment of the invention, the apparatus, method and computer program further comprise, respectively, the means, steps and computer-readable program code to receive an access request from an origin manager, determining a management access template relationship with an identifier of said origin manager, and further send a response to said access request which comprises one or more access attributes comprised in said template. Accordingly, an origin manager can, in an early stage, obtain information about the devices and data objects it can be primarily entitled to manage, as well as about the corresponding allowed management operations it can be allowed to request.

DETAILED DESCRIPTION

Some exemplary embodiments of the invention shall now be described in detail with references to FIGS. 1 to 4.

Figure 1:
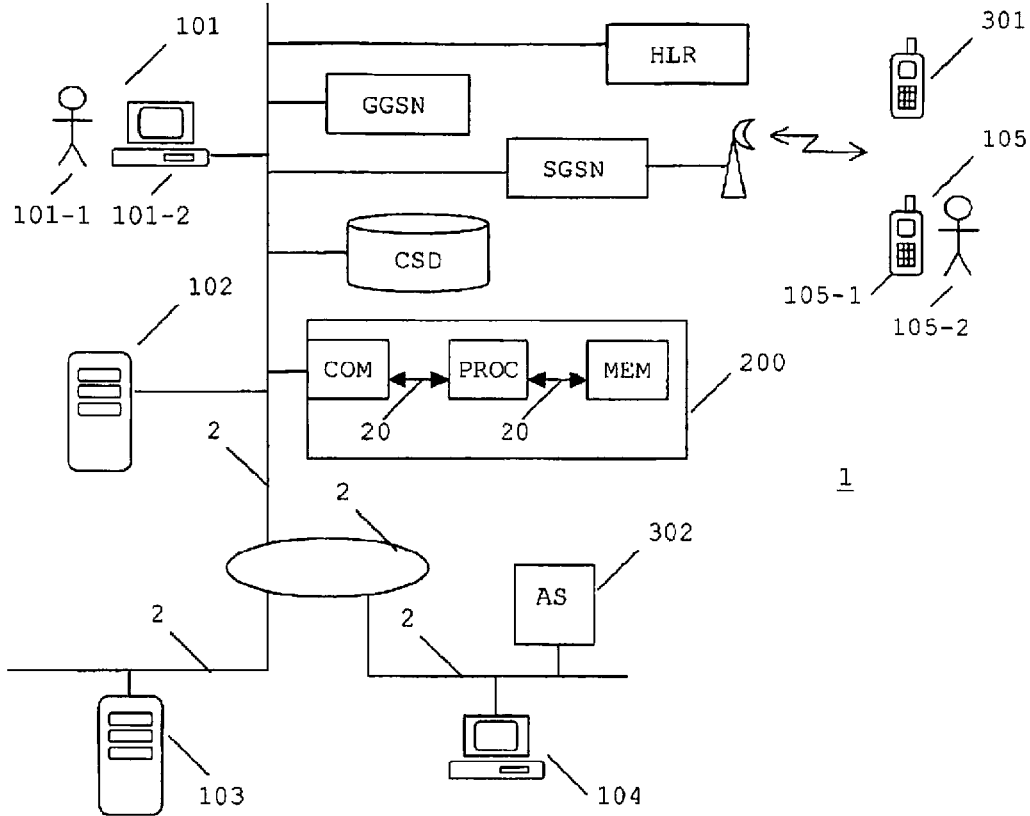
FIG. 1 shows a simplified physical view of a telecommunication system comprising a plurality of managed devices, a plurality of origin managers and an apparatus for mediating in management orders according to the invention.

The telecommunications system (1) illustrated schematically in FIG. 1 shows, by way of example, some elements which are common to a state-of-the-art mobile system. This kind of telecommunications system has been selected to primarily exemplify a complex telecommunications system, wherein, due to the plurality of different kind of devices which can be managed, as well as due the plurality of different kind of origin managers, the principles of the invention can apply more advantageously. However, as it will be understood by the skilled person, the scope of the present invention is not limited to any particular kind of telecommunications system.

In particular, the telecommunications system (1) of FIG. 1 shows, interconnected by means of communication networks (2), a plurality of managed devices (HLR, GGSN, SGSN, CSD, 301, 302), a plurality of origin managers (101, 102, 103, 104, 105) and a management mediator apparatus (200). In this scenario, various management process can take place for said managed devices which involve sending of management orders requesting the execution of management operations over managed data objects held on said devices, some of which will be now cited.

For example, the element CSD can be a Common Subscription Database which stores all the subscription data of the subscribers served by the telecommunications system (1); wherein, for example, not only the particular kind of data stored in a Home Location Register HLR for a user are kept (e.g.: his MSISDN, data for activated and/or available Supplementary Services such as Call Forwarding data, his IMSI, etc), but also data related to the provision of some services which can be provided by other application servers (e.g. AS 302); and thus, it can be some kind of master data repository for subscription data for the users of the telecommunications system. Some data stored in a CSD or in an HLR for a user can change due to various reasons (e.g. new subscribed services, change on some existing data, change of MSISDN, new IMSI, etc). Also, for a given user who subscribes as subscriber of the system (1) and/or subscribes to some specific services, some data records would have to be initially set in a HLR and/or in a CSD. Besides, the performance of a given management process involving a given subscriber can require the obtainment of some data already stored in a HLR or in a CSD for said subscriber. Accordingly, an origin manager 103 can be a Customer Administration System, CAS, entitled to manage subscriber data stored in the HLR and in the CSD. Alternatively, there can be an origin manager 101 can be entitled to issue management orders which involve the management of subscriber data stored in the HLR and in the CSD; wherein, for example, a given user 101-1 entitled as user data administrator operates a management server, e.g. computer 101-2 to issue the corresponding management orders for the HLR and/or the CSD.

Similarly, an origin manager 102 can be entitled to issue management orders which involve the management of general operational data in some telecommunication nodes (such as HLRS, SGSNs, GGSNs, etc) and which governs, for example, the error handling in said nodes, the configuration of the communication interfaces, etc. Alternatively, and as cited above, there can be an origin manager (e.g. 101) which can be entitled to issue, for example, some management orders to some nodes (e.g. only those related to alarm handling in some or all the SGSNs in the telecommunications system 1); wherein, in this particular case, the user 101-1 who operates the computer 101-2 may or may be not the same user as the one entitled to manage subscriber related data, being this aspect dependent on a specific management policy which can be advantageously controlled according to the invention.

As cited earlier, a telecommunication system (1) can further comprise devices, such as application servers ASs, which are intended to provide services beyond the, say, basic communication services which provide the core telecommunication nodes (e.g. Public Switches, MSCs, SGSNs, HLRs, etc), and which can belong or not to the same network operator which owns said core nodes. An application server AS 302 is shown in FIG. 1 in cooperation with other telecommunication nodes to provide a given service to some subscribers. The specific service (or services) provided by the AS 302 is not relevant for the invention; but, as an example, it can be assumed it is related to media delivery for various thematic channels. Accordingly, to manage AS 302 an origin manager 104 can be provided which is assigned to issue management orders which affects managed objects in said AS (e.g.: parameters which controls an execution aspect of the provided service, such as a parameter governing the quality of service for all the users of the service, or per user of the service; information elements for shaping or characterizing the content of the information provided by said function or service; etc). Origin manager 104 can also be expected to issue some management orders towards other devices. For example, it can need to read some subscriber data from the CSD and/or to set some service related data there.

The advent of new services has caused the subscriber terminals become more complex, having some of them similar capabilities to some state-of-the-art computer based systems. Thus, for example, a mobile terminal (e.g. 301) can be configured with some operational data from a mobile telecommunications system via the same radio interface it uses to establish basic communications. Similarly, a given subscriber 105-1 can operate his mobile terminal 105-2 as a management server in order to manage a manageable data object related to his subscription (e.g. setting a service preference, obtainment of data related to his subscribed services, etc). As in the case cited above, whether or not a subscriber can manage some of his data only from his terminal (e.g. a mobile terminal wherein said subscriber is attached to the system 1) is a management policy which can advantageously controlled according to the invention.

The management mediator apparatus 200 shown in FIG. 1 is also connected to the communication networks (2) to mediate in the management orders issued by the various origin managers for the various managed devices. The internal simplified structure of the management mediator apparatus 200 shown in FIG. 1 considers a possible implementation as a computer-based apparatus, which, as in most of the modern telecommunications systems, is a preferred implementation basis for telecommunication nodes and servers. Accordingly, the computer-based mediator 200 comprises: a communication interface COM arranged to receive and issue management orders, a data storage MEM arranged to store processing instructions as well as other data to perform its specific operation, a processor PROC arranged to execute said processing instructions, and internal data buses 20 to communicate these elements.

Figure 2:
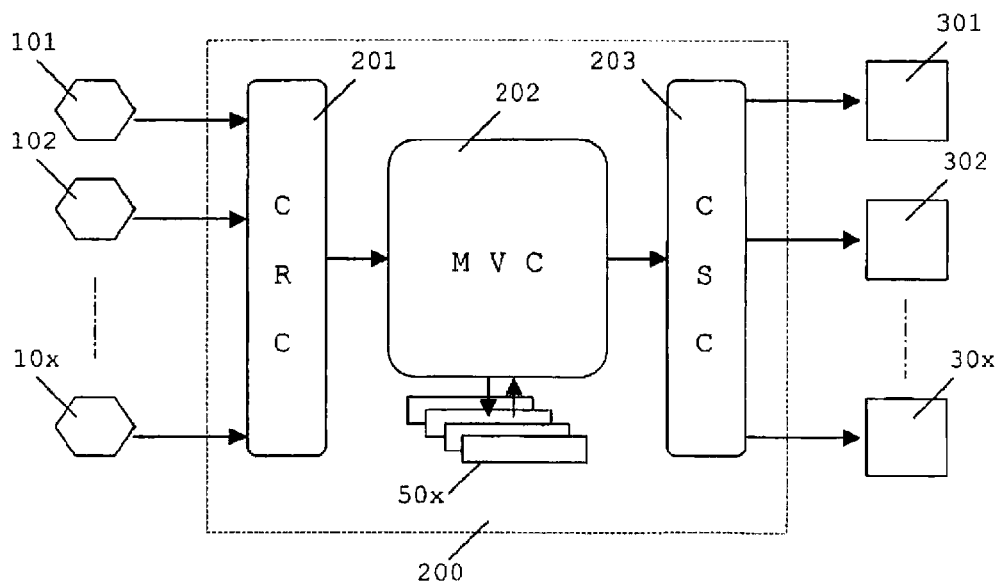
FIG. 2 shows a simplified schematic view of some functional components of an apparatus for mediating in management orders according to the invention as well as their relationships with origin managers and managed devices.

A simplified schematic functional view of some functional components (201, 202, 203) of an apparatus for mediating in management orders 200 according to the invention is given in FIG. 2. Said functional components can be accomplished according to various implementation alternatives that can comprise software, hardware or combinations of both.

The apparatus 200 comprises a Communication Receiver Component CRC 201 as a functional component arranged to receive management orders from a plurality of origin managers (101, 102 . . . , 10*x*). Accordingly, the CRC 201 complies with the management protocols which can be utilized by the plurality of origin managers to issue management orders so as to implement a managed endpoint agent, and thus, arranged to extract the information elements conveyed in the management orders it receives (i.e.: as a managed endpoint agent does primarily in a managed device by parsing the content of a management order it receives to obtain the identifier of the requested operation, the identifier of the managed data object said operation refers, etc). As will be later described, the CRC 201 can be also arranged to receive other kind of communications which are not management orders.

Once the information elements referenced in a received management order have been extracted from the content of said order, said information is passed to a Management Verifier Component MVC 202, which is a functional element which performs a checking of the content of the received order against one or more access attributes comprised in one or more management access templates 50*x* to determine whether a received management order is an allowed management order, and thus, if it can be sent to the appropriate managed device(s). As will be later described, the MVC 202 can further add and/or replace some elements which relate to a receive order so as to route it properly towards the affected managed device(s). Also, as will be later described, the MVC 202 can be further arranged to perform some determinations which can help or guide to a given origin manager in what concerns to the management operations which can be primarily allowed for said origin manager.

Finally, an approved management order is sent towards the managed device(s) affected by it (301, 302, 30*x*) by the Communication Sender Component CSC 203, which is the functional element in the management mediating apparatus 200 that performs the equivalent reversal functions as the CRC 201; thus, the CSC 203 performs similar actions as the ones performed by a managing agent in a management server and complies with the corresponding management protocol to send said approved order (e.g.: syntax defined by the management protocol, format and coding of the messages that convey the management orders, protocol timers, associated state-machine, etc). As will be later described, the CSC 202 can be also arranged to send other kind of communications which are not management orders sent towards managed devices.

The access attributes to check the suitability of a given management order can be advantageously structured in different management templates respectively related to the elements and entities involved in a management process (e.g.: origin managers, managed devices, managed data objects, and generic management roles). Thus, the desired degree of granularity can be established so as to allow to define and reinforce a sufficiently detailed management policy which considers possible combinations in management orders between the origin managers, the managed devices and the managed data objects. Some examples detailing the possible content of different kind of management templates shall now be given.

A management template defined in relationship with an identifier of an origin manager can comprise one or more access attributes which identify: the allowed management operations that can be sent from said origin manager, the devices to which said origin manager is entitled to send a management order and the data objects which can be managed from said origin manager as well as their corresponding pattern structure; and it can further identify the allowed management operations from said origin manager per device and/or per data object.

A management template defined in relationship with an identifier of a managed data object can comprise one or more access attributes which identify: a valid pattern structure of said data object, the management operations which are permitted over said data object and the origin managers allowed to request the execution of management operations affecting said data object. The management template defined in relationship with managed data object can further identify a device that stores it, as well as the set of allowed operations per origin manager and/or per device.

A management template defined in relationship with an identifier of a managed device can comprise one or more access attributes which identify: the origin managers allowed to send a management order to said device, the management operations which are permitted over said device and the data objects which are stored on said device; wherein it can further identify the set of allowed operations per origin manager and/or per data object.

Figure 3:
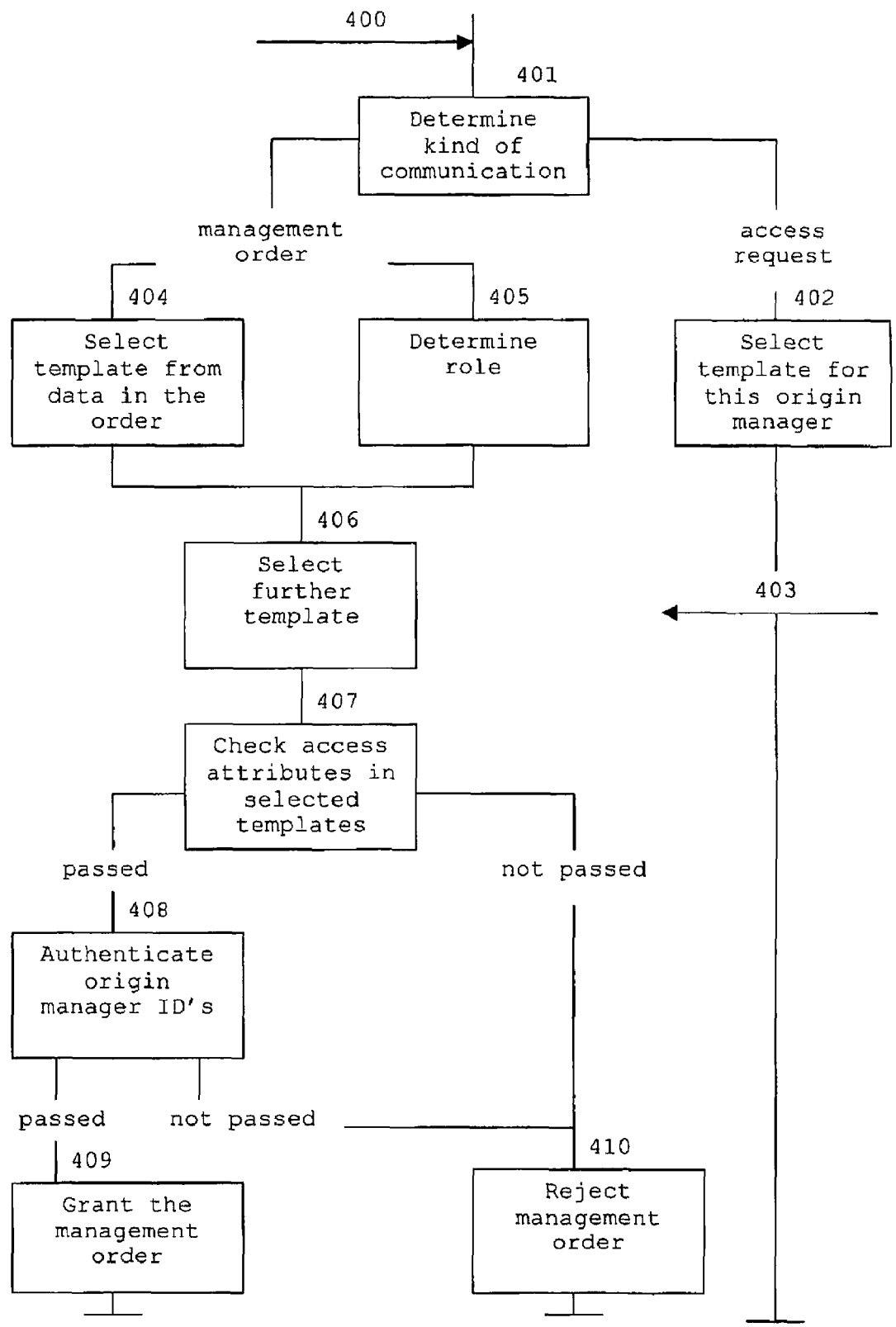
FIG. 3 shows a flowchart illustrating some steps of a mediated management process according to the invention.
Figure 4:
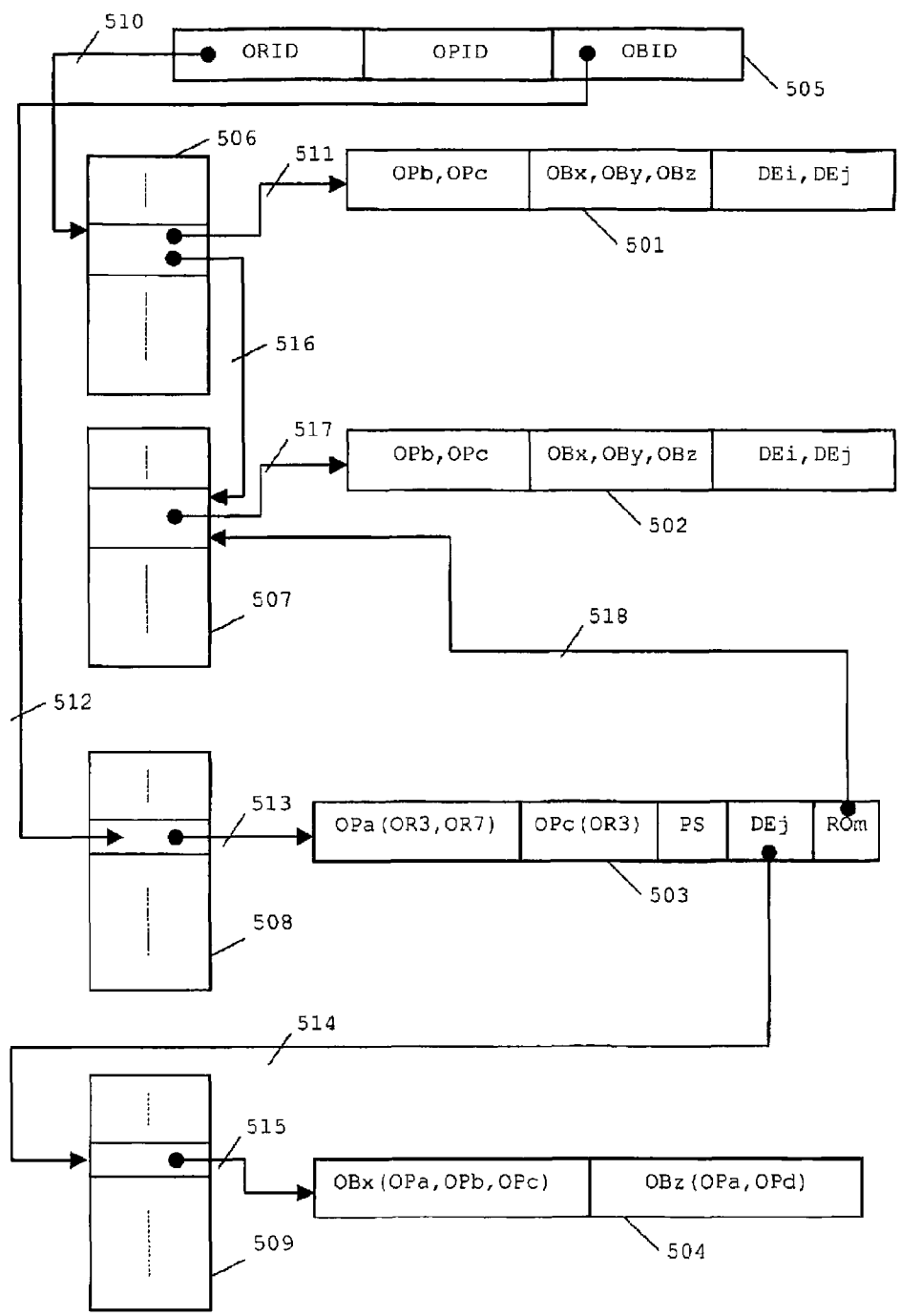
FIG. 4 shows some examples of data structures and their corresponding relationship to accomplish with a mediated management process according to the invention.

A functional overview of a management process mediated by a mediating apparatus 200 according to the invention shall now be given with references to the management step of the flowchart of FIG. 3 and to the data structures and relationships illustrated in FIG. 4.

In step 400 a communication is received from a origin manager (10x) in the management mediating apparatus 200. Next, in step 401, it is determined the kind of received communication. This can be achieved by means of various techniques. One option can be, for example, to distinguish the transport protocol port said communication is received in the apparatus 200 (e.g. Transmission Control Protocol TCP or User Datagram Protocol UDP, provided that a TCP/IP or UDP/IP is used in the communication network 2). Alternatively, or additionally, an analysis of the content of the received communication 400 can be performed. Two kind of communications are considered in the example illustrated in the flow of FIG. 3; the first one being a management order, and the second one an access request from an origin manager.

If the received communication is a management order, in step 404 a management access template is selected utilizing the data extracted from said received management order. For example, as illustrated in the example case shown in FIG. 4, the data extracted (505) from the received management order comprises an identifier of the origin manager (ORID), an identifier of a requested management operation (OPID), and an identifier of a managed data object to which said operation concerns (OBID). It shall be noticed that the identifier of the origin manager (ORID) can be received explicitly in the management order or can be inferred from it (e.g. an identifier of the sender received in the order, an IP address of the management server sending the order, etc). Accordingly, the ORID can be: an identifier of the management server which sends the management order (e.g.: an URL, an IP address, a credential comprising a digital signature, etc), an identifier of the user operating the management server (e.g.: a user name formed, for example, by an alphanumeric string, or other kind of identifier, such as a mail URL, an MSISDN, a credential comprising a digital signature, etc), or a combination of both. In either case, the MVC 202 can perform a further step (408) to authenticate an identifier received concerning the origin manager, or even, to request to the user operating the management server to enter, e.g., a user name (if no identifier of the origin manager ORID has been received) and a password. It shall be noticed here that, although the authentication step 408 is shown as a later processing step of a management order, it can take place equally at any other processing stage which takes place after the reception of the communication 400, including any processing stage for processing an access request (steps 402 and 403).

Although secured communications can be accomplished between management servers and the mediating apparatus 200 by using well known techniques (such as IPSEC or Secure Socket Layer/Transport Layer Security SSL/TLS) so as to guarantee some security concerning the management servers which sends management orders, the authentication step 408 performed by the mediating apparatus 200 can be useful wherever it is desired to implement a policy to control the user who is operating a given management server, and thus, to determine whether certain management operations can be requested considering who is operating a given management server.

Once an identifier ORID of the origin manager has been extracted from the received management order, or obtained by other means, a management access template in relationship with said identifier can be selected in step 404. To accomplish this, the storage means in the mediating apparatus 200 (or in other apparatus arranged to store information and to be queried from it) can hold a list (506) of identifiers of allowed origin managers, which allow to find (510, 511) the management template(s) which corresponds to said identifier. In the example illustrated in FIG. 4, a management access template 501 is found to be related for an identifier ORID of the sending origin manager. In this particular example case, this template comprises: identifiers of two allowed operations (OPb,OPc) for this origin manager, identifiers of three allowed managed objects (OBx,OBy,OBz), and identifiers of two allowed managed devices (DEi,DEj). It shall be noticed that, although only one template (501) has been depicted in FIG. 4 as selected in relationship with the identifier of an origin manager, more than one templates can be selected if more than one identifiers of said origin manager are obtained (e.g.: an identifier of the management server sending the management order, and an identifier of a user operating said management server).

In the example of FIG. 4, another management access template 503 in relationship with the identifier of a managed data object indicated in the received order OBID is also selected in step 404. This template is found similarly as described above for the management template 501 selected according to an identifier of the origin manager ORID. Namely, a set of identifiers of managed data objects are previously stored (508), and the identifier of a data object in the received management order is used (512, 513) to find out the corresponding template(s). In this particular example case, this template comprises: identifiers of one allowed operation (OPa) allowed to be invoked from two origin managers (OR3, OR7), the pattern structure of this managed data object (PS), the identifier of a device (DEj) which holds this data object. Management template 503 also shows the identifier of a management role (ROm) in relationship with this managed object.

A role determination is performed in step 405. This role determination is made by first utilizing (510) the identifier of the origin manager ORID to further find out (516) the management role associated to said identifier (if any). So, for example, identifiers related to a plurality of subscribers can be stored in relationship with a "subscriber" role, which allows a limited set of management operations over a limited set of devices. Similarly, the identifiers of a given origin manager type (such as a set of Customer Administration Systems CASs, or service provider administration systems, or Business to Business trader partners administration systems, etc) can be equally be assigned respectively to the appropriate role which, in turn, would determine a limited set of management operations over a limited set of devices for said roles. In the particular example shown in FIG. 4 this is accomplished by storing a list of a set of role identifiers (507); wherein, for a given identifier of a given origin manager, it can be stored a reference which helps to identify (516) the corresponding associated role (if any). Accordingly with the illustrated example, a further template 502 is selected (510, 516, 517) in relation with the ORID. In the particular example case illustrated, template 502 comprises: identifiers of two allowed operations (OPb,OPc) for this management role, identifiers of three allowed managed objects (OBx,OBy,OBz), and identifiers of two allowed managed devices (DEi,Dej).

A further step (not shown in FIG. 3) can take place to assist in the selection of management access template(s) from identifiers received in a management order. Thus, a further storage of information (as cited earlier: in the mediating apparatus 200, or in a cooperating storage apparatus) can comprise a relationship between the identifiers of a set of management operations and the identifiers of managed data objects affected by each of said operations. Alternatively, or in addition to it, a relationship can be further stored between said set of management operations and the managed devices affected by each of said operations. Thus, the MVC 202 could in said step (not shown in FIG. 3) to use the identifier of a management operation indicated in a received management order OPID to, for example, determine a data object affected by said operation or determine an affected device; being this useful to either: determine these data if not explicitly received in the management order (e.g. to further select a corresponding management template), and also to check whether an identifier of a data object or device received in the order matches with the ones stored for the requested management operation.

Step 406 represents the selection of further management access template(s) to check the received management order; wherein said further management access template(s) is(are) selected from data which are not directly received in the management order, but are selected according to an access attribute comprised in another management access template (s) selected primarily to check said received management order (501, 502, 503). For example, a routable identifier of a managed device can be hidden for an origin manager which, in turn, can be configured only with a routable identifier to get the mediating apparatus 200. In a similar way as described above for other identifiers, the identifiers of a plurality of managed devices can be stored (509) in relationship with their corresponding management access templates; thus, allowing to determine (514, 515) management access templates in relationship with said managed devices. According to the example illustrated in FIG. 4, an identifier of the involved managed device (DEj) is obtained from an access attribute stored in the management access template (503) which has been selected for the managed data object affected by the received order, and then, this identifier is used to find out (514, 515) another management access template 504 defined for said device to process the received management order. In this particular example case, template 504 comprises: identifiers of two managed data objects stored in this device (OBx,OBz), and the identifiers of, respectively, three allowed operations (OPa,OPb,OPc) for the first one and two (OPa,OPd) for the second one.

Further, a management access template can be selected in step 406 in relationship with an allowed role contained in another selected template. Thus, for example, a management access template in relationship with an allowed role (ROm) specified in the selected managed object template 503 can be further selected (518,517). This can be useful in case more than one role templates (502) have been found in relationship with the identifier of the origin manager, or also when no role templates were primarily found in relationship with said identifier.

In step 407 the MVC 202 verifies whether the management order can be granted or not by checking whether the content 505 of the received management order 400 fits with the access attributes of the selected templates (501,502,503,504) and even whether the access attributes of a selected template match the corresponding ones in another selected template. For example, a given origin manager can be allowed to manage a given data object; however, it might be entitled only to obtain the content of said data object, but not to invoke any management operations which involves modification or initial setting of said object. Similarly, a given management role for subscribers can allow a plurality of operations over a certain data object type (e.g. subscription service data); however, for a particular subscriber operating his mobile phone as a management server, might be only allowed to send management orders that invoke management operations related to his own subscription service data, or to a subset of said data. Accordingly the MVC 202 grants in step 409 only management orders which fits with management access attributes defined in relationship with origin managers, managed devices and managed data objects; otherwise, the received management order is rejected (step 410). The rejection step 410 can comprise some signaling towards the requesting management server if, for example, it proceeds according to the management protocol utilized. The MVC 202 can also verify whether the structure of a managed data object received in a management order (e.g. which invokes an operation that involves a modification or an initial setting of said data object) is according to a predefined pattern structure of said object, and thus, e.g., avoid that a data is set to a given value which is out of the intended range, or that some data fulfils a predefined syntax, etc.

The step 409 of granting the received management order can comprise the sending of said order to the corresponding managed device according to the specific management protocol utilized to convey said order to said device; wherein, as stated earlier, said order can be sent using data not originally received in the management order 400 (such as a routable address of the managed device), and also, e.g., comprising some other data not received in said order (for example, comprised in a selected management access template). Also, since the content of the access attributes comprised in the management access templates are no less than data objects subject to be managed, the mediating apparatus 200 can further comprise a Management Execution Component (not shown in the functional view of FIG. 2) arranged to perform management operations over this particular kind of managed data object. Thus, in this case, the MVC can be further arranged to detect whether a managed data object affected by a received management order involves an access attribute in a management access template (e.g. only one access attribute, a whole template, etc); this can be accomplished, for example, by assigning specific data object identifiers to said access attributes (and/or to said templates) or by assigning specific operation identifiers for managing them. Accordingly, when an access attribute is affected by a received management order, and provided it is an allowed management order, said Management Execution Component will be invoked in step 409 to perform the requested management operations) over said attribute.

If in step 401 it is determined that the received communication 400 is an access request, in step 402 one or more management access templates can be selected utilizing the data in said access request. For example, in a simple case a given user operating a management server contacts the mediating apparatus 200 and sends an access request which comprises an identifier he has been assigned to. Subsequently, in step 402, the MVC 202 can determine, for example, a management access template related to this identifier and/or another management access template related to a role associated to this identifier. Next, in step 403, access attributes contained in the selected template(s) can be sent (for example, translated to a suitable format) back to the accessing management server as an answer to the received access request in order to be displayed as management options allowed for this user, or for the management server, or for this user from this management server.

The invention has been described in respect to some exemplary embodiments in an illustrative and non-restrictive manner. Variations can be readily apparent to those of ordinary skill in the art. For this reason, the invention is to be interpreted and limited in view of the claims.

The invention claimed is:

1. A hardware-containing apparatus for mediating in management orders between a plurality of origin managing devices and a plurality of managed devices in a telecommunications system, the management orders intended to execute management operations over the managed devices, comprising:
- a communication receiver component arranged to receive a management order from one of the origin managing devices;
- a management verifier component arranged to determine whether the received management order is an allowed management order by checking whether content of the received management order fits access attributes comprised in a first management access template in relationship with an identifier of the origin managing device, a second management access template in relationship with an identifier of a managed data object affected by the management order, and a third management access template in relationship with an identifier of a managed device affected by the management order;
- a communication sender component arranged to send an allowed management order to a managed device; and
- the hardware-containing apparatus is interposed between the plurality of origin managing devices and the plurality of managed devices so as to receive management orders from the plurality of origin managing devices and issue allowed management orders to the plurality of managed devices.

2. The apparatus of claim 1, wherein the first management access template further comprises at least one access attribute selected from the group consisting of: an identifier of an allowed management operation; an identifier of an allowed managed data object; a pattern structure of the managed data object; an identifier of an allowed managed device; an identifier of an allowed management operation over an allowed managed device; and an identifier of an allowed management operation over an allowed managed data object.

3. The apparatus of claim 1, wherein the second management access template further comprises at least one access attribute selected from the group consisting of: a pattern structure of the managed data object; an identifier of an allowed management operation; an identifier of a managed device holding the managed data object; an identifier of an allowed origin managing device; an identifier of an allowed management operation from an allowed origin managing device; and an identifier of an allowed management operation over a holding managed device.

4. The apparatus of claim 1, wherein the third management access template comprises at least one access attribute selected from the group consisting of: an identifier of an allowed management operation; an identifier of a managed data object held on the managed device; an identifier of an allowed origin managing device; an identifier of an allowed management operation from an allowed origin managing device; and an identifier of an allowed management operation over a held managed data object.

5. The apparatus of claim 1, wherein the management verifier component is arranged to determine, from the identifier of a management operation, at least one identifier, the identifier being one selected from the group consisting of: an identifier of a managed data object affected by the operation; and an identifier of a managed device, affected by the operation.

6. The apparatus of claim 1, wherein the management verifier component is arranged to select a management access template, among the first, second, and third management templates, according to an identifier received in a management order.

7. The apparatus of claim 6, wherein the management verifier component is arranged to select a management access template, among the first, second, and third management templates, according to an access attribute comprised in another selected management access template.

8. The apparatus of claim 6, wherein the identifier of the origin managing device comprises at least one identifier selected from the group consisting of: an identifier of a management server sending a management order; and an identifier of a user operating the management server; and
wherein the management verifier component is arranged to select the first management access template according to the at least one identifier.

9. The apparatus of claim 6, wherein the identifier of the origin managing device comprises at least one identifier selected from the group consisting of: an identifier of a management server sending a management order; and an identifier of a user operating the management server; and wherein the management verifier component is arranged to authenticate the at least one identifier.

10. The apparatus of claim 6, wherein the management verifier component is arranged to determine a management role associated to at least one identifier, the identifier being one selected from the group consisting of: an identifier of a management server sending a management order; and an identifier of a user operating the management server.

11. The apparatus of claim 10, wherein the management verifier component is further arranged to select at least one management access template in relationship with the role.

12. The apparatus of claim 10, wherein at least one management access template among the second or third management templates comprises an identifier (ROm) of at least one role as an access attribute, and wherein the Management Verifier Component is further arranged to check whether the management order fits with the role.

13. The apparatus of claim 1, wherein the management verifier component is arranged to determine whether a managed data object affected by an allowed management order is an access attribute in a management access template, and further comprising a management execution component, arranged to execute a management operation over the access attribute.

14. The apparatus of claim 1, wherein the communication receiver component is further arranged; to receive an access request from one of the origin managing devices;
wherein the management verifier component is further arranged to determine the first management access template; and
wherein the communication sender component is further arranged to send an access response to the origin managing device that comprises an access attribute of the management access template.

15. In a telecommunications system, a method implemented by a hardware-containing apparatus for mediating in the management of a plurality of managed devices from a plurality of origin managing devices, comprising the steps of:
- receiving a management order from one of the origin managing devices in the managed device;
- executing a management operation requested by the management order in the managed device;
- the step of receiving a management order comprising the further steps of:
- receiving a management order in a centralized management mediator;
- determining whether the received management order is an allowed management order by checking in the centralized management mediator whether content of the received management order fits access attributes comprised in a first management access template in relationship with an identifier of the origin managing device, a second management access template in relationship with an identifier of a managed data object affected by the management order, and a third management access template in relationship with an identifier of a managed device affected by the management order;

granting the management order to be sent to a managed device if it is an allowed management order; and the hardware-containing apparatus is interposed between the plurality of origin managing devices and the plurality of managed devices so as to receive management orders from the plurality of origin managing devices and issue allowed management orders to the plurality of managed devices.

16. The method of claim 15, wherein the step of checking the management order comprises the further step of determining, from the identifier of a management operation, at least one identifier selected from the group consisting of: an identifier of a managed data object affected by the operation; and an identifier of a managed device, affected by the operation.

17. The method of claim 16, wherein the step of checking the management order comprises the further step of selecting a management access template, among the first, second, and third management templates, according to an identifier received in a management order.

18. The method of claim 17, wherein the step of checking the management order comprises the further step of selecting a management access template, among the first, second, and third management templates, according to an access attribute comprised in another selected management access template.

19. The method of claim 17, wherein the identifier of the origin managing device comprises at least one identifier among: an identifier of a management server sending a management order; an identifier of a user operating the management server; and wherein the step of selecting a management access template comprises the further step of selecting the first management access template according to the at least one identifier.

20. The method of claim 17, wherein the identifier of the origin managing device comprises at least one identifier selected from: an identifier of a management server sending a management order; and an identifier of a user operating the management server; and wherein the step of checking the management order comprises the further step of authenticating the at least one identifier.

21. The method of claim 17, wherein the step of checking the management order comprises the further step of determining a management role associated to at least one identifier selected from: an identifier of a management server sending a management order; and an identifier of a user operating the management server.

22. The method of claim 21, wherein the step of checking the management order comprises the further step of selecting a management access template in relationship with the role.

23. The method of claim 21, wherein at least one management access template among the second or third management templates comprises an identifier (ROm) of at least one role as an access attribute, and wherein the step of checking the management order comprises the further step of checking whether the management order fits with the role.

24. The method of claim 15, wherein the step of checking the management order comprises the further step of checking whether a managed data object affected by an allowed management order is an access attribute in a management access template; and wherein the step of granting the management order comprises the further step of executing a management operation over the access attribute.

25. The method of claim 15, comprising the further steps of:

receiving an access request from the origin managing device;

determining the first management access template; and sending an access response to the origin managing device that comprises an access attribute of the management access template.

26. A computer program stored on a non-transitory data storage in a computer-based apparatus for mediating management orders between a plurality of origin managing devices and a plurality of managed devices in a telecommunications system, the management orders intended to execute management operations over the managed devices, comprising:

a computer-readable program having code adapted to cause a computer-based apparatus to process the reception of a management order from one of the origin managing devices;

the computer-readable program having code adapted to cause the computer-based apparatus to determine whether a received management order is an allowed management order by checking whether content of the received management order fits access attributes comprised in a first management access template in relationship with an identifier of the origin managing device, a second management access template in relationship with an identifier of a managed data object affected by the management order, and a third management access template in relationship with an identifier of a managed device affected by the management order, the computer-readable program having code adapted to cause the computer-based apparatus to send an allowed management order to a managed device; and the computer-based apparatus is interposed between the plurality of origin managing devices and the plurality of managed devices so as to receive management orders from the plurality of origin managing devices and issue allowed management orders to the plurality of managed devices.

27. The computer program of claim 26, further comprising the computer-readable program having code adapted to cause the computer-based apparatus to determine, from the identifier of a management operation, at least one identifier selected from: an identifier of a managed data object affected by the operation; and an identifier of a managed device, affected by the operation.

28. The computer program of claim 26, further comprising the computer-readable program having code adapted to cause the computer-based apparatus to select a management access template, among the first, second, and third management templates, according to an identifier received in a management order.

29. The computer program of claim 28, further comprising the computer-readable program having code adapted to cause the computer-based apparatus to select a management access template, among the first, second, and third management templates, according to an access attribute comprised in another selected management access template.

30. The computer program of claim 28, wherein the identifier of the origin managing device comprises at least one identifier among: an identifier of a management server sending a management order; an identifier of a user operating the management server; and the computer-readable program having code adapted to cause the computer-based apparatus to select the first management access template according to the at least one identifier.

31. The computer program of claim 28, wherein the identifier of the origin managing device comprises at least one identifier selected from among: an identifier of a management server sending a management order; an identifier of a user operating the management server; and wherein the computer-readable program has code adapted to cause the computer-based apparatus to authenticate the at least one identifier.

32. The computer program of claim 28, further comprising the computer-readable program having code adapted to cause the computer-based apparatus to determine a management role associated to at least one identifier selected from: an identifier of a management server sending a management order; and an identifier of a user operating the management server.

33. The computer program of claim 32, further comprising the computer-readable program having code adapted to cause the computer-based apparatus to select at least one management access template in relationship with the role.

34. The computer program of claim 32, wherein at least one management access template among the second or third management templates comprises an identifier (ROm) of at least one role as an access attribute, and further comprising a computer-readable program code for causing the computer-based apparatus to check whether the management order fits with the role.

35. The computer program of claim 26, further comprising the computer-readable program having code adapted to cause the computer-based apparatus to determine whether a managed data object affected by an allowed management order is an access attribute in a management access template, and a computer-readable program code for causing the computer-based apparatus to execute a management operation over the access attribute.

36. The computer program of claim 26, further comprising:

the computer-readable program having code adapted to cause the computer-based apparatus to process the reception of an access request from the origin managing device;

the computer-readable program having code adapted to cause the computer-based apparatus to determine the first management access template, and the computer-readable program having code adapted to cause the computer-based apparatus to send an access response to the origin managing device that comprises an access attribute of the management access template.

* * * * *